(12) United States Patent
Kranepuhl

(10) Patent No.: US 11,572,055 B2
(45) Date of Patent: Feb. 7, 2023

(54) METHOD AND CONTROL UNIT FOR OPERATING A HYBRID VEHICLE

(71) Applicant: ZF Friedrichshafen AG, Friedrichshafen (DE)

(72) Inventor: Tobias Kranepuhl, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 312 days.

(21) Appl. No.: 16/814,402

(22) Filed: Mar. 10, 2020

(65) Prior Publication Data

US 2021/0179066 A1 Jun. 17, 2021

(30) Foreign Application Priority Data

Mar. 11, 2019 (DE) .................... 10 2019 203 241.9

(51) Int. Cl.
*B60W 20/15* (2016.01)
*B60W 10/06* (2006.01)
(Continued)

(52) U.S. Cl.
CPC ............ *B60W 20/15* (2016.01); *B60W 10/02* (2013.01); *B60W 10/06* (2013.01); *B60W 10/08* (2013.01);
(Continued)

(58) Field of Classification Search
CPC ...... B60W 20/15; B60W 10/02; B60W 10/06; B60W 10/08; B60W 10/10; B60W 10/119;
(Continued)

(56) References Cited

U.S. PATENT DOCUMENTS 6,113,515 A * 9/2000 Salecker ............... F16D 48/064
477/76
6,808,470 B2 10/2004 Boll
(Continued)

FOREIGN PATENT DOCUMENTS

DE 19949204 A1 4/2000
DE 10158536 A1 7/2003
(Continued)

OTHER PUBLICATIONS

German Search Report DE102019203241.9 dated Jan. 7, 2020. (16 pages).

*Primary Examiner* — Brian P Sweeney
(74) *Attorney, Agent, or Firm* — Dority & Manning, P.A.

(57) ABSTRACT

A method for operating a hybrid vehicle that includes a prime mover (1) with an internal combustion engine (2), an electric machine (3), a transmission (4) connected between the prime mover (1) and a driven end (5), and multiple shift elements, including a separating clutch (7) connected between the internal combustion engine (2) and the electric machine (3), and a starting component (8), is provided. After release of a brake pedal (12) or together with the release of the brake pedal (12) for a driving start or an crawling start, an engagement speed threshold (22) for the starting component (8) is established below an idling speed of the prime mover (1) and a previously disengaged starting component (8) is engaged. A control unit (9, 10, 11) for carrying out such a method is also provided.

11 Claims, 2 Drawing Sheets

(51) Int. Cl.
*B60W 10/08* (2006.01)
*B60W 10/10* (2012.01)
*B60W 40/08* (2012.01)
*B60W 30/18* (2012.01)
*B60W 10/119* (2012.01)
*B60W 10/02* (2006.01)
*B60W 40/06* (2012.01)

(52) U.S. Cl.
CPC .......... *B60W 10/10* (2013.01); *B60W 10/119* (2013.01); *B60W 30/18027* (2013.01); *B60W 40/06* (2013.01); *B60W 40/08* (2013.01); B60W 2510/0638 (2013.01); B60W 2510/081 (2013.01); B60W 2510/1025 (2013.01); B60W 2540/10 (2013.01); B60W 2540/12 (2013.01); B60W 2552/15 (2020.02)

(58) Field of Classification Search
CPC .......... B60W 30/18027; B60W 40/06; B60W 40/08; B60W 2510/0638; B60W 2510/081; B60W 2510/1025; B60W 2540/10; B60W 2540/12; B60W 2552/15; B60W 2510/1015; B60W 2710/021; B60W 2710/027; B60W 10/11; B60W 10/18; B60W 30/18063; B60W 30/186; B60K 2006/4825; B60K 6/48; Y02T 10/62

See application file for complete search history.

(56) References Cited

U.S. PATENT DOCUMENTS

| | | |
|---|---|---|
| 8,858,390 B2 | 10/2014 | Schiele et al. |
| 8,961,345 B2 | 2/2015 | Kaltenbach et al. |
| 2012/0238404 A1* | 9/2012 | Schiele .................. B60K 6/48 180/65.265 |
| 2018/0194341 A1 | 7/2018 | Owen et al. |
| 2019/0061733 A1 | 2/2019 | Buhle et al. |

FOREIGN PATENT DOCUMENTS

| | | |
|---|---|---|
| DE | 102007002172 A1 | 7/2008 |
| DE | 102007016515 A1 | 10/2008 |
| DE | 102011101410 A1 | 11/2012 |
| DE | 102012218367 A1 | 4/2014 |
| DE | 102017215172 A1 | 2/2019 |
| EP | 2509836 B1 | 10/2012 |
| GB | 2532107 A | 5/2016 |
| WO | WO 2008/122392 | 10/2008 |
| WO | WO 2012/156041 | 11/2012 |

* cited by examiner

METHOD AND CONTROL UNIT FOR OPERATING A HYBRID VEHICLE

CROSS-REFERENCE TO RELATED APPLICATION

The present application is related and has right of priority to German Patent Application No. 10 2019 203 241.9 filed on Mar. 11, 2019, the entirety of which is incorporated by reference for all purposes.

FIELD OF THE INVENTION

The invention relates generally to a method for operating a hybrid vehicle. Moreover, the invention relates generally to a control unit for carrying out the method.

BACKGROUND

FIG. 1 shows a diagram of a drive train of a hybrid vehicle. A hybrid vehicle includes a prime mover 1, which includes an internal combustion engine 2 and an electric machine 3. Moreover, a hybrid vehicle includes a transmission 4, which is connected between the prime mover 1 and a driven end 5 of the hybrid vehicle. An electric accumulator 6 cooperates with the electric machine 3. When the electric machine 3 is operated as a motor, the electric accumulator 6 is discharged to a greater extent. When the electric machine 3 is operated as a generator, the electric accumulator 6 is charged to a greater extent. A separating clutch 7 is connected between the internal combustion engine 2 and the electric machine 3. The transmission 4 includes multiple shift elements 8. One single shift element 8 is shown, by way of example, in FIG. 1. During the starting operation of the hybrid vehicle, one of the shift elements 8 of the transmission 4 can act as a transmission-internal starting component. In contrast thereto, it is also possible that a separate, transmission-external starting component is connected between the electric machine 3 and the transmission 4.

The operation of the transmission 4 is controlled by a transmission control unit 9 by way of an open-loop system and/or a closed-loop system. The operation of the internal combustion engine 2 is controlled by an engine control unit 10 by way of an open-loop system and/or a closed-loop system. The operation of the electric machine 3 is controlled by a hybrid control unit 11 by way of an open-loop system and/or a closed-loop system. The hybrid control unit 11 can also control the separating clutch 7. The dashed-line double arrows of FIG. 1 visualize the data exchange of the control units 9, 10, and 11 with the appropriate assemblies of the hybrid vehicle. For example, the transmission control unit 9 exchanges data with the transmission 4 and the hybrid control unit 11. The engine control unit 10 exchanges data with the internal combustion engine 2 and the hybrid control unit 11. Moreover, the hybrid control unit 11 exchanges data with the electric machine 3, the electric accumulator 6, and the separating clutch 7.

FIG. 1 also shows a brake pedal 12 and an accelerator pedal 13, wherein the accelerator pedal 13 is also referred to as a gas pedal. Depending on a driver-side actuation of the brake pedal 12 and depending on a driver-side actuation of the accelerator pedal 13, drive torque can be made available at the driven end 5. For this purpose, the brake pedal 12 and the accelerator pedal 13 can exchange data with the engine control unit 10 and/or the hybrid control unit 11 and/or with the transmission control unit 9.

For the case in which such a hybrid vehicle is operated, during a crawling operation, with the brake pedal 12 released or not actuated and with the accelerator pedal 13 not actuated, the starting component 8 is operated, according to practical experience, with a differential speed in a so-called continuous slip operation, in order to increase the controllability and improve a transition into a driving start upon actuation of the accelerator pedal 13.

GB 2 532 107 A1 describes a hybrid vehicle and a method for operating a hybrid vehicle. The transmission of the hybrid vehicle disclosed therein can be operated in different operating modes, in order to adapt the hybrid vehicle to roadways having different friction. It is known from this prior art, for example, that the transmission can be operated in a low driving position as well as in a high driving position, wherein the low driving position is utilized, in particular, in off-road environments.

SUMMARY OF THE INVENTION

On the basis thereof, example aspects of the invention create a new type of method for operating a hybrid vehicle and of creating a control unit for carrying out the method.

According to example aspects of the invention, after the release of a brake pedal or together with the release of the brake pedal for the driving start or the crawling start, an engagement speed threshold for the starting component is established below an idling speed of the prime mover and the previously disengaged starting component is engaged by increasing a power transmission capacity of the starting component.

In this case, monitoring is preferably carried out to determine whether an output-side rotational speed of the starting component or a rotational speed corresponding thereto reaches the engagement speed threshold. For the case in which it is established that the output-side rotational speed of the starting component or the rotational speed corresponding thereto reaches the engagement speed threshold, the power transmission capacity of the starting component is increased to the extent that the power transmission capacity of the starting component is greater than the torque present at the input of the transmission at the idling speed.

With example aspects of the invention, it is provided that, for the crawling start or driving start, the starting component is no longer actuated with a differential speed and, therefore, in a slip condition. Rather, during the crawling start or driving start, a slip at the starting component is completely eliminated and the starting component is therefore completely engaged. As a result, the heat input into the starting component can be reduced. The fuel consumption can also be reduced. For this purpose, for the case in which the brake pedal is released and, therefore, is no longer actuated by the driver, in order to start driving or crawling, the engagement speed threshold for the starting component is lowered and, in fact, below the idling speed of the prime mover. If the starting component is engaged during the driving start or the crawling start, the output-side rotational speed of the starting component or the rotational speed corresponding thereto reaches the engagement speed threshold. The starting component is then operated, with the aid of an appropriate pressure control, in such a way that the power transmission capacity thereof is increased and, in fact, in such a way that the power transmission capacity of the starting component is greater than the torque transmitted or to be transmitted at the idling speed. If the vehicle subsequently travels over an obstacle or enters a slope, the rotational speed of the prime mover is controlled, by a closed-loop system, to the idling speed, in order to hold the crawl speed of the vehicle. The starting component does not disengage in this case.

According to an advantageous example refinement, after or together with the release of the brake pedal, a disengagement speed threshold for the starting component is established below the idling speed of the prime mover in such a way that this is below the engagement speed threshold. Therefore, a particularly advantageous operation of the hybrid vehicle is possible during the crawling start and/or the driving start.

Preferably, after or together with a brake pedal actuation, the engagement speed threshold and the disengagement speed threshold are re-established above the idling speed of the prime mover in such a way that the disengagement speed threshold is below the engagement speed threshold. If the brake pedal is actuated during the driving start or the crawling start, the starting component can be subsequently disengaged in a defined manner.

According to one advantageous example refinement of the invention, the hybrid vehicle crawls at idling speed for the case in which the accelerator pedal is not actuated after the increase of the power transmission capacity of the starting component. If the hybrid vehicle is operated downhill on a downhill gradient in this case, the electric machine provides a negative torque at the input of the transmission and an electric accumulator of the hybrid vehicle is charged to a greater extent. Even during steep downhill travel during a crawling operation, the idling speed of the prime mover can be held and, in fact, due to the fact that a negative torque is made available at the input of the transmission with the aid of the electric machine operating as a generator. Therefore, the brake pedal does not need to be actuated in order to crawl or drive downhill at a constant speed. The electric accumulator of the hybrid vehicle can be charged with the aid of the electric machine operated as a generator.

According to one advantageous example refinement of the invention, for the case in which a brake pedal actuation is greater than a limiting value, or for the case in which the power transmission capacity of the starting component does not suffice to overcome a driving resistance in the form of a slope or an obstacle, the starting component is disengaged. Due to the disengagement of the starting component, a stalling of the internal combustion engine can be prevented. If, for example, an obstacle cannot be overcome with the aid of a maximum permissible crawl torque, the rotational speed of the prime mover is depressed, and the rotational speed then deviates downwardly from the idling speed, whereby the disengagement speed threshold of the starting component is reached or fallen below and, in this way, a disengagement of the starting component is initiated.

For the case in which the transmission is a group transmission including a main group providing driving gears and a range unit downstream from the main group and providing a high driving position and a low driving position, the method is preferably utilized only for the case in which the low driving position has been selected in the range unit. For the case in which the hybrid vehicle is an all-wheel vehicle including an activatable and deactivatable all-wheel drive, the method is preferably utilized only when the all-wheel drive is activated. The invention is preferably utilized only for the case in which the low driving position has been selected in a group transmission and/or for the case in which all-wheel drive has been activated, in the case of an all-wheel vehicle.

BRIEF DESCRIPTION OF THE DRAWINGS

Exemplary embodiments of the invention are explained in greater detail with reference to the drawings, without being limited thereto. Wherein.

DETAILED DESCRIPTION

Figure 1:
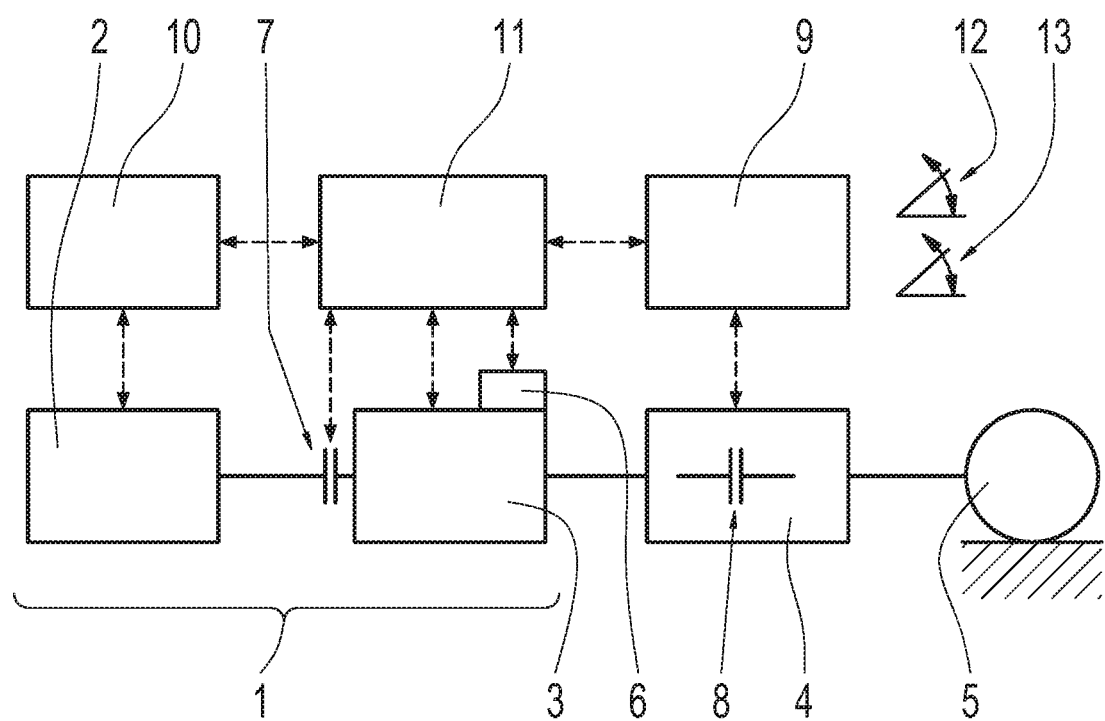
FIG. 1 shows a block diagram of a hybrid vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The fundamental configuration of a hybrid vehicle is known to a person skilled in the art, who is addressed here, and has been described above with reference to FIG. 1. In this regard, reference is made to the comments set forth with respect to FIG. 1. The invention now relates to a method for operating a hybrid vehicle, with the aid of which an advantageous driving start or crawling start can be ensured.

For the case in which the hybrid vehicle is resting, in particular, on a level road with the prime mover 1 running and the brake pedal 12 actuated, and the brake pedal 12 is subsequently released, then, after the release of the brake pedal 12 or together with the release of the brake pedal 12 for the driving start or crawling, an engagement speed threshold for the starting component 8 is established below an idling speed of the prime mover 1 and the previously disengaged starting component 8 is engaged, in particular along a ramp.

In the process, monitoring is carried out to determine whether an output-side rotational speed of the starting component 8 or a rotational speed corresponding thereto reaches the engagement speed threshold for the starting component 8.

If it is established that this is the case, i.e., that the output-side rotational speed of the starting component 8 or the rotational speed corresponding thereto has reached the engagement speed threshold, the power transmission capacity of the starting component 8 is further increased and, in fact, to such an extent that the power transmission capacity of the starting component 8 is greater than the torque transmitted or to be transmitted at the idling speed, preferably to such an extent that a maximum possible crawl torque can be transmitted by the starting component 8.

During the driving start or the crawling start, therefore, according to example aspects of the invention, the starting component 8 is not actuated with a differential speed and operated in a slip condition. Rather, the slip at the starting component 8 is completely eliminated during crawling and a driving start. As a result, a heat input into the starting component 8 can be reduced. Moreover, a fuel consumption of the hybrid vehicle can be reduced.

Figure 2:
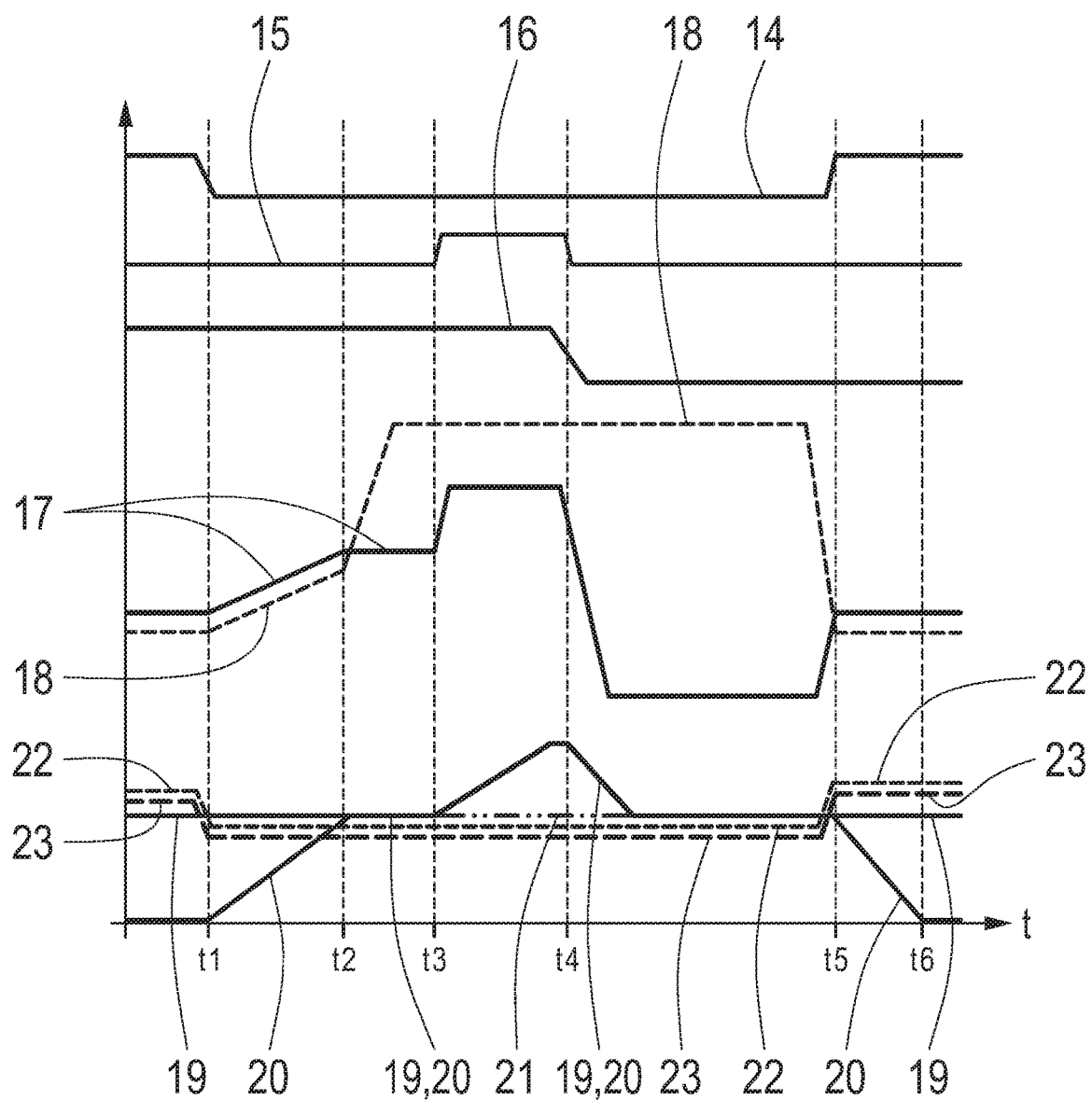
FIG. 2 shows a timing diagram for illustrating the method according to example aspects of the invention for operating a hybrid vehicle.

Further example details of the invention are described in the following with reference to FIG. 2, wherein multiple temporal curve profiles over the time t are shown in FIG. 2. The curve profile 14 shows a driver-side actuation of the brake pedal 12 and the curve profile 15 shows a driver-side actuation of the accelerator pedal 13. A curve profile 16 illustrates a roadway slope or roadway inclination. The curve profile 17 shows a torque present at an input of the transmission 4, and the curve profile 18 shows a torque transmittable by the starting component 8. The curve profile 19 visualizes an input-side rotational speed of the starting component 8, and the curve profile 20 visualizes an output-side rotational speed of the starting component 8. The curve profile 21 visualizes the idling speed of the prime mover 1. The curve profiles 22 and 23 show rotational speed thresholds, namely the curve profile 22 showing an engagement speed threshold for the starting component 8 and the curve profile 23 showing a disengagement speed threshold for the starting component 8.

Before the point in time t1, the hybrid vehicle is at a standstill on a level road. The prime mover 1 provides an idling speed, i.e., the input-side rotational speed 19 of the starting component 8 corresponds to the idling speed 21 of the prime mover 1. The brake pedal 12 is actuated according to the curve profile 14, i.e., the hybrid vehicle is held at a standstill. The starting component 8 is completely disengaged before the point in time t1 and the output-side rotational speed 20 thereof is zero.

The idling speed of the prime mover 1 can be made available either by the internal combustion engine 2 or by the electric machine 3. If the idling speed is made available by the internal combustion engine 2, the separating clutch 7 is engaged. If the idling speed of the electric machine 3 is made available while the internal combustion engine 2 is at a standstill, the separating clutch 7 is disengaged.

As described above, before the point in time t1, the brake pedal 12 is actuated according to the curve profile 14. The engagement speed threshold 22 and the disengagement speed threshold 23 for the starting component 8 are then both established above the idling speed 21 of the prime mover 1, wherein the disengagement speed threshold 23 is below the engagement speed threshold 22.

At the point in time t1, the brake pedal 12 is released, i.e., there is no more brake pedal actuation. After the release of the brake pedal 12 or together with the release of the brake pedal 12, in order to start the driving operation or the crawling operation of the hybrid vehicle, the starting component 8 is engaged in a defined manner according to the curve profile 20, preferably along a ramp and, in fact, until the slip at the starting component 8 has been completely eliminated at the point in time t2.

Moreover, after the release of the brake pedal 12 or together with the release of the brake pedal 12, the engagement speed threshold 22 and, preferably, also the disengagement speed threshold 23 for the starting component 8 are established below the idling speed 21 of the prime mover 1 and, in fact, in such a way that the disengagement speed threshold 23 is below the engagement speed threshold 22 for the starting component 8.

At the point in time t2, the output-side rotational speed 20 of the starting component 8 or a rotational speed corresponding thereto reaches the engagement speed threshold 22 for the starting component 8. Between the points in time t1 and t2, monitoring is carried out to determine whether the output-side rotational speed 20 of the starting component 8 or a rotational speed corresponding thereto reaches the engagement speed threshold 22 for the starting component 8.

If it is determined that this is the case, the power transmission capacity of the starting component 8 is increased. FIG. 2 shows that, for the case in which the output-side rotational speed 20 of the starting component 8 reaches the engagement speed threshold 22 at the point in time t2, the torque transmittable by the starting component 8 is increased according to the curve profile 18 and, in fact, in such a way that the power transmission capacity of the starting component 8 is greater than the torque 17 present at the input of the transmission at the idling speed, wherein the power transmission capacity is increased according to the curve profile 18 to such an extent that the starting component 8 can transmit a maximum permissible crawl torque.

Between the points in time t2 and t3, an idling speed controller for the prime mover 1 controls, by way of a closed-loop system, the rotational speed of the prime mover 1, with the accelerator pedal 13 not actuated, to the idling speed 21, so that travel therefore takes place at a defined crawl speed.

In FIG. 2, an actuation of the accelerator pedal 13 takes place at the point in time t3 according to the curve profile 15. According to the curve profile 18, the starting component 8 can transmit the torque 17, which is increasing due to the accelerator pedal actuation, at the transmission input. The rotational speeds 19, 20 increase, so that the speed of the hybrid vehicle also increases due to the actuation of the accelerator pedal 13.

If the actuation of the accelerator pedal 13 is retracted at the point in time t4, the torque 17 at the transmission input decreases. The rotational speeds 19 and 20 of the starting component 8 also decrease. The starting component 8 is still completely engaged, i.e., is operated without slip.

In FIG. 2, the vehicle moves, beginning at the point in time t4, with the accelerator pedal 13 not actuated and with the brake pedal 12 not actuated, onto a downhill gradient, i.e., is operated downhill. The idling speed controller then controls, by way of a closed-loop system, the rotational speeds 19, 20 at the starting component 8 and the rotational speed of the prime mover 1 to the idling speed 21 and, in fact, by way of the fact that a negative torque is made available at the input of the transmission 4, according to the curve profile 17, by the electric machine 3 with the starting component 8 engaged. The electric machine 3 is then operated as a generator.

This negative torque made available by the electric machine 3 operating as a generator is a recuperative torque, with the aid of which the electric accumulator 6 of the hybrid vehicle can be charged to a greater extent. As described above, the starting component 8 remains engaged. Therefore, the negative torque is active at the driven end 5 and travel can take place downhill at the defined crawl speed without actuation of the brake pedal 12.

At the point in time t5, the brake pedal 12 is actuated according to the curve profile 14. With the brake pedal 12 actuated, the rotational speed thresholds 22 and 23 for the starting component 8 are re-established and, in fact, in such a way that the engagement speed threshold 22 as well as the disengagement speed threshold 23 of the starting component 8 are above the idling speed 21 and, in fact, in such a way that the disengagement speed threshold 23 is below the engagement speed threshold 22.

Subsequent to the actuation of the brake pedal at the point in time t5, the output-side rotational speed 20 of the starting component 8 crosses or falls below the disengagement speed threshold 23, so that, subsequent to the point in time t5, the starting component 8 is disengaged according to the curve profile 20 and, in fact, by reducing the power transmission capacity, preferably along a ramp.

At the point in time t6, the starting component 8 is completely disengaged. The hybrid vehicle is then held at a standstill with the brake actuated, i.e., with the brake pedal 12 actuated. The torque 17 at the transmission input is positive, in order to control, by way of a closed-loop system, the input-side rotational speed 19 of the starting component 8 to the idling speed 21.

For the case in which the hybrid vehicle meets an obstacle or enters a slope with the starting component 8 engaged, the starting component 8 remains engaged. The idling speed controller of the prime mover 1 attempts to hold the idling speed and, therefore, the crawl speed of the hybrid vehicle. If the obstacle cannot be overcome or the slope cannot be managed despite the maximum permissible crawl torque, the starting component 8 is disengaged. In this case, the rotational speed, namely the output-side rotational speed 20 of the starting component 8, is depressed, and it deviates downwardly from the idling speed 21, whereby the disengagement speed threshold 23 for the starting component 8 is fallen below, which then results in the disengagement of the starting component 8.

If the hybrid vehicle would be brought to a standstill by an obstacle, even though the accelerator pedal is actuated, the rotational speed of the prime mover would be depressed again and the output-side rotational speed of the starting component 8 would fall below the disengagement opening speed 23, so that a disengagement of the starting component 8 would be caused in this case as well.

With the starting component 8 disengaged, the rotational speed of the prime mover 1 can then be controlled, by way of a closed-loop system, to the idling speed 21. Moreover, with the accelerator pedal 13 actuated, the rotational speed of the prime mover 1 can be controlled, by way of a closed-loop system, to a specified rotational speed and the power transmission capacity of the starting component 8 can be increased to such an extent and, thereafter, engaged, that the obstacle can be overcome. This applies under the condition that, via the actuation of the accelerator pedal 13, a sufficiently high driver-input torque is demanded by the prime mover 1.

The transmission 4 is preferably a group transmission including a main group providing driving gears and a range unit downstream from the main group and providing a high driving position and a low driving position. The above-described method is utilized when the low driving position has been selected in the range unit.

The hybrid vehicle is preferably an all-wheel vehicle including an activatable and deactivatable all-wheel drive. The above-described method is utilized when the all-wheel drive is activated.

Example aspects of the invention also relate to a control unit for operating a hybrid vehicle, which is configured for carrying out the above-described method on the control side. The control unit includes means for carrying out the method according to example aspects of the invention, namely hardware-related means and software-related means. The hardware-related means include data interfaces for exchanging data with the assemblies contributing to the carrying-out of the method according to example aspects of the invention, such as with the starting component 8 and the brake pedal 12. The hardware-related means also encompass a processor for data processing and a memory for data storage. The software-related means include program components for carrying out the method according to example aspects of the invention.

After the release of the brake pedal 12 or together with the release of the brake pedal 12 for the driving start or the crawling start, the control unit establishes the engagement speed threshold 22 for the starting component 8 below an idling speed of the prime mover 1 and actuates the previously disengaged starting component 8 to engage. The control unit carries out monitoring, in this case, to determine whether an output-side rotational speed of the starting component 8 or a rotational speed corresponding thereto reaches the engagement speed threshold 22, wherein, for the case in which the control unit establishes that this is the case, the control unit increases the power transmission capacity of the starting component 8 to the extent that the power transmission capacity of the starting component 8 is greater than the torque present at the input of the transmission 4 at the idling speed.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS

1 prime mover
2 internal combustion engine
3 electric machine
4 transmission
5 driven end
6 electric accumulator
7 separating clutch
8 starting component
9 transmission control unit
10 engine control unit
11 hybrid control unit
12 brake pedal
13 accelerator pedal
14 actuation of the brake pedal
15 actuation of the accelerator pedal
16 roadway slope
17 torque at the input of the transmission
18 transmittable torque of the starting component
19 input-side rotational speed of the starting component
20 output-side rotational speed of the starting component
21 idling speed of the prime mover
22 engagement speed threshold of the starting component
23 disengagement speed threshold of the starting component

The invention claimed is:

1. A method for operating a hybrid vehicle that comprises a prime mover (1) with an internal combustion engine (2) and an electric machine (3), a transmission (4) connected between the prime mover (1) and a driven end (5) and including multiple shift elements, a separating clutch (7) connected between the internal combustion engine (2) and the electric machine (3), and a starting component (8) that is configured as either a separate starting component or one of the multiple shift elements of the transmission (4), the method comprising:
    after release of a brake pedal (12) or together with the release of the brake pedal (12) for a driving start or a crawling start, establishing an engagement speed threshold (22) for the starting component (8) below an idling speed of the prime mover (1), the engagement speed threshold (22) established by a control unit (9, 10, 11); and
    engaging the previously disengaged starting component (8) by increasing a power transmission capacity of the starting component (8), wherein the hybrid vehicle is an all-wheel drive vehicle that comprises an all-wheel drive system, and wherein the method is implemented only when the all-wheel drive system is activated.

2. The method of claim 1, further comprising:

monitoring, by the control unit (9, 10, 11), an output-side rotational speed of the starting component (8) or a rotational speed corresponding output-side rotational speed of the starting component (8) to determine whether the output-side rotational speed of the starting component (8) or the rotational speed corresponding to the output-side rotational speed of the starting component (8) reaches the engagement speed threshold (22); and when the output-side rotational speed of the starting component (8) or the rotational speed corresponding to the output-side rotational speed of the starting component (8) reaches the engagement speed threshold (22), increasing the power transmission capacity of the starting component (8) such that the power transmission capacity of the starting component (8) is greater than a torque present at an input of the transmission (4) at the idling speed.

3. A method for operating a hybrid vehicle that comprises a prime mover (1) with an internal combustion engine (2) and an electric machine (3), a transmission (4) connected between the prime mover (1) and a driven end (5) and including multiple shift elements, a separating clutch (7) connected between the internal combustion engine (2) and the electric machine (3), and a starting component (8) that is configured as either a separate starting component or one of the multiple shift elements of the transmission (4), the method comprising:

after release of a brake pedal (12) or together with the release of the brake pedal (12) for a driving start or a crawling start, establishing an engagement speed threshold (22) for the starting component (8) below an idling speed of the prime mover (1), the engagement speed threshold (22) established by a control unit (9, 10, 11);

engaging the previously disengaged starting component (8) by increasing a power transmission capacity of the starting component (8); and after the release of the brake pedal (12) or together with the release of the brake pedal (12), establishing a disengagement speed threshold (23) for the starting component (8) below the idling speed of the prime mover (1) such that the disengagement speed threshold (23) for the starting component (8) is less than the engagement speed threshold (22) for the starting component (8), the disengagement speed threshold (23) established by the control unit (9, 10, 11).

4. A method for operating a hybrid vehicle that comprises a prime mover (1) with an internal combustion engine (2) and an electric machine (3), a transmission (4) connected between the prime mover (1) and a driven end (5) and including multiple shift elements, a separating clutch (7) connected between the internal combustion engine (2) and the electric machine (3), and a starting component (8) that is configured as either a separate starting component or one of the multiple shift elements of the transmission (4), the method comprising:

after release of a brake pedal (12) or together with the release of the brake pedal (12) for a driving start or a crawling start, establishing an engagement speed threshold (22) for the starting component (8) below an idling speed of the prime mover (1), the engagement speed threshold (22) established by a control unit (9, 10, 11);

engaging the previously disengaged starting component (8) by increasing a power transmission capacity of the starting component (8); and after or together with actuation of the brake pedal (12), re-establishing the disengagement speed threshold (23) for the starting component (8) above the idling speed of the prime mover (1) such that the disengagement speed threshold (23) for the starting component (8) is less than the engagement speed threshold (22), the disengagement speed threshold (23) re-established by the control unit (9, 10, 11).

5. A method for operating a hybrid vehicle that comprises a prime mover (1) with an internal combustion engine (2) and an electric machine (3), a transmission (4) connected between the prime mover (1) and a driven end (5) and including multiple shift elements, a separating clutch (7) connected between the internal combustion engine (2) and the electric machine (3), and a starting component (8) that is configured as either a separate starting component or one of the multiple shift elements of the transmission (4), the method comprising:

after release of a brake pedal (12) or together with the release of the brake pedal (12) for a driving start or a crawling start, establishing an engagement speed threshold (22) for the starting component (8) below an idling speed of the prime mover (1), the engagement speed threshold (22) established by a control unit (9, 10, 11);

engaging the previously disengaged starting component (8) by increasing a power transmission capacity of the starting component (8); and after or together with an actuation of the brake pedal (12), re-establishing the engagement speed threshold (22) for the starting component (8) such that the engagement speed threshold (22) for the starting component (8) is greater than the idling speed of the prime mover (1), the engagement speed threshold (22) re-established by the control unit (9, 10, 11).

6. A method for operating a hybrid vehicle that comprises a prime mover (1) with an internal combustion engine (2) and an electric machine (3), a transmission (4) connected between the prime mover (1) and a driven end (5) and including multiple shift elements, a separating clutch (7) connected between the internal combustion engine (2) and the electric machine (3), and a starting component (8) that is configured as either a separate starting component or one of the multiple shift elements of the transmission (4), the method comprising:

after release of a brake pedal (12) or together with the release of the brake pedal (12) for a driving start or a crawling start, establishing an engagement speed threshold (22) for the starting component (8) below an idling speed of the prime mover (1), the engagement speed threshold (22) established by a control unit (9, 10, 11);

engaging the previously disengaged starting component (8) by increasing a power transmission capacity of the starting component (8); and when the accelerator pedal (13) is actuated after increasing the power transmission capacity of the starting component (8), the starting component (8) remains engaged such that a torque depending on the actuation of the accelerator pedal (13) is transmittable through the starting component (8).

7. A method for operating a hybrid vehicle that comprises a prime mover (1) with an internal combustion engine (2) and an electric machine (3), a transmission (4) connected between the prime mover (1) and a driven end (5) and including multiple shift elements, a separating clutch (7) connected between the internal combustion engine (2) and the electric machine (3), and a starting component (8) that is configured as either a separate starting component or one of the multiple shift elements of the transmission (4), the method comprising:
- after release of a brake pedal (12) or together with the release of the brake pedal (12) for a driving start or a crawling start, establishing an engagement speed threshold (22) for the starting component (8) below an idling speed of the prime mover (1), the engagement speed threshold (22) established by a control unit (9, 10, 11);
- engaging the previously disengaged starting component (8) by increasing a power transmission capacity of the starting component (8);
- when accelerator pedal (13) is not actuated after increasing the power transmission capacity of the starting component (8), the hybrid vehicle crawls at idling speed; and
- when the hybrid vehicle operates on a downhill gradient, the electric machine provides a negative torque at the input of the transmission (4) and an electric accumulator (6) charges.

8. A method for operating a hybrid vehicle that comprises a prime mover (1) with an internal combustion engine (2) and an electric machine (3), a transmission (4) connected between the prime mover (1) and a driven end (5) and including multiple shift elements, a separating clutch (7) connected between the internal combustion engine (2) and the electric machine (3), and a starting component (8) that is configured as either a separate starting component or one of the multiple shift elements of the transmission (4), the method comprising:
- after release of a brake pedal (12) or together with the release of the brake pedal (12) for a driving start or a crawling start, establishing an engagement speed threshold (22) for the starting component (8) below an idling speed of the prime mover (1), the engagement speed threshold (22) established by a control unit (9, 10, 11);
- engaging the previously disengaged starting component (8) by increasing a power transmission capacity of the starting component (8); and
- when an actuation of the brake pedal (12) is greater than a limiting value or when the power transmission capacity of the starting component (8) does not suffice to overcome a driving resistance, disengaging the starting component (8) by the control unit (9, 10, 11).

9. A method for operating a hybrid vehicle that comprises a prime mover (1) with an internal combustion engine (2) and an electric machine (3), a transmission (4) connected between the prime mover (1) and a driven end (5) and including multiple shift elements, a separating clutch (7) connected between the internal combustion engine (2) and the electric machine (3), and a starting component (8) that is configured as either a separate starting component or one of the multiple shift elements of the transmission (4), the method comprising:
- after release of a brake pedal (12) or together with the release of the brake pedal (12) for a driving start or a crawling start, establishing an engagement speed threshold (22) for the starting component (8) below an idling speed of the prime mover (1), the engagement speed threshold (22) established by a control unit (9, 10, 11); and
- engaging the previously disengaged starting component (8) by increasing a power transmission capacity of the starting component (8),
- wherein the transmission (4) is a group transmission that comprises a main group and a range unit downstream from the main group, the main group configured to provide driving gear ratios, the range unit configured to provide a high driving range and a low driving range, and wherein the method is implemented only when the low driving range is selected in the range unit.

10. A control unit (9, 10, 11) for operating a hybrid vehicle that comprises a prime mover (1) with an internal combustion engine (2) and an electric machine (3), a transmission (4) connected between the prime mover (1) and a driven end (5) and including multiple shift elements, a separating clutch (7) connected between the internal combustion engine (2) and the electric machine (3), and a starting component (8) that is configured as either a separate starting component or one of the multiple shift elements of the transmission (4), the control unit (9, 10, 11) configured for:
- after release of a brake pedal (12) or together with the release of the brake pedal (12) for a driving start or a crawling start, establishing an engagement speed threshold (22) for the starting component (8) below an idling speed of the prime mover (1); and
- engaging the previously disengaged starting component (8) by increasing a power transmission capacity of the starting component (8), and
- wherein the hybrid vehicle is an all-wheel drive vehicle that comprises an all-wheel drive system, and wherein the control unit (9, 10, 11) establishes the engagement speed threshold (22) and engages the previously disengaged starting component (8) only when the all-wheel drive system is activated.

11. The control unit (9, 10, 11) of claim 10, where the control unit (9, 10, 11) is further configured for:
- determining whether an output-side rotational speed of the starting component (8) or a rotational speed corresponding to the output-side rotational speed of the starting component (8) reaches the engagement speed threshold (22); and
- when the output-side rotational speed of the starting component (8) or the rotational speed corresponding to the output-side rotational speed of the starting component (8) reaches the engagement speed threshold (22), increasing the power transmission capacity of the starting component (8) such that the power transmission capacity of the starting component (8) is greater than a torque present at an input of the transmission (4) at the idling speed.

* * * * *